Sept. 30, 1941.    J. G. KEEGAN    2,257,385
STORAGE WATER HEATER
Filed Sept. 11, 1939
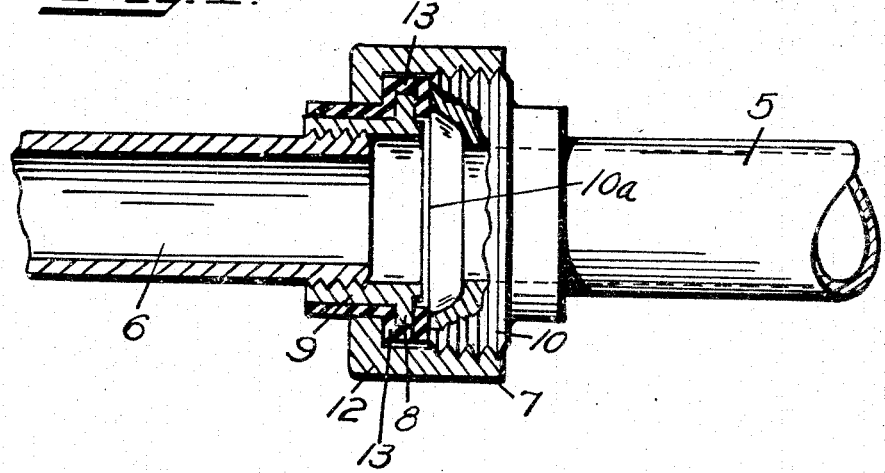
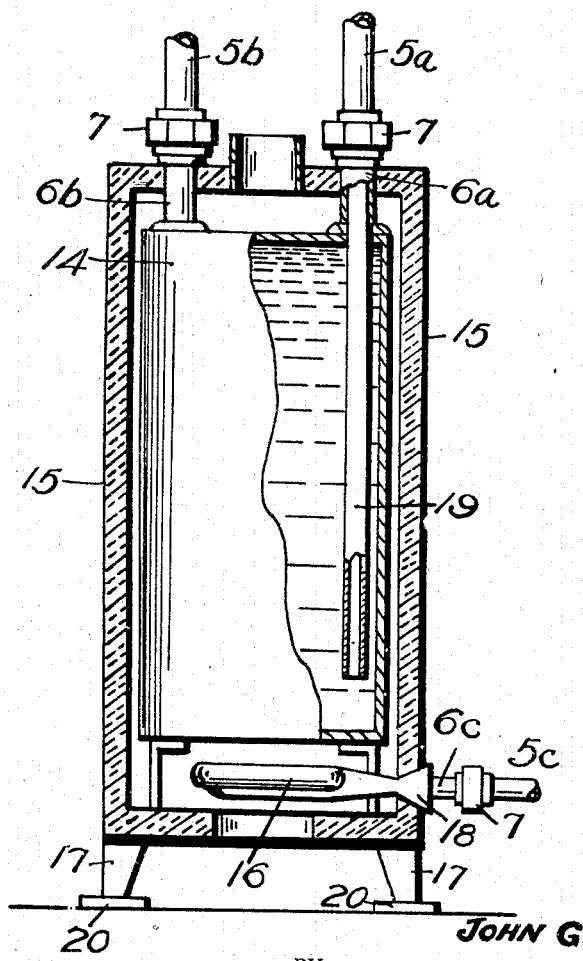
INVENTOR.
JOHN G. KEEGAN
BY
Rollandet, McGrew & Campbell
ATTORNEYS.

Patented Sept. 30, 1941

2,257,385

UNITED STATES PATENT OFFICE 2,257,385

STORAGE WATER HEATER

John G. Keegan, Cheyenne, Wyo.

Application September 11, 1939, Serial No. 294,333

8 Claims. (Cl. 122—13)

This invention relates to improvements in storage water heaters.

Various types of storage water heaters are in common use. The fundamental elements of most storage water heaters are a tank connected with a source of cold water supply, such as, for instance, a city water main, means such as a gas burner or an electric heating element positioned adjacent the tank to heat the water therein, a heat insulating jacket around the tank, and a conductive connection between the tank and the hot water distributing system. Such storage water heaters are in common use in private homes, apartments, hotels and other places where a continuous source of hot water is desired.

It has been discovered that when a storage water heater tank of this type is connected with a city water main, electrolytic decomposition of the tank is inclined to occur. This is primarily due to the fact that there are different kinds of metals present in the assembly, i. e., the tank may be made of iron and the pipe line connection may be galvanized iron, copper or brass.

It is common practice to bring the cold water supply in through the top of a water heater tank and project the tube or pipe that conducts the water, down through the tank so that the incoming cold water may be discharged adjacent the lower portion thereof. In such an assembly if the downwardly projecting pipe within the tank is a metallic electrical conductor and the tank itself is metal of a different kind, which is usually the case, then a certain amount of galvanic action ordinarily is set up, particularly when the water in the tank is heated. This galvanic action creates electrical currents which are considerably stimulated by the fact that the incoming water pipe serves as an excellent "ground" for the assembly. As above pointed out, these electrical currents tend to decompose the metal of the tank and other associated parts and fittings, with the result that leaks may develop and the tank eventually may have to be replaced.

Another phase of the decomposition of the metal of the tank, resides in the fact that the electrical currents tend to decompose the water in the tank, liberating oxygen which in turn tends to corrode by oxidation the tank and associated fittings.

A still further cause for electrolytic decomposition of a water heater tank sometimes develops when the tank is installed adjacent an electric street railway line or other source of electrical energy that may be grounded. Under such circumstances, electrical currents may flow from the ground along a water or gas pipe line to the tank assembly.

Therefore, it is a principal object of the present invention to provide a connection for a water or gas pipe, to a storage water heater that is a non-conductor of electricity, whereby the galvanic and electrolytic actions above explained will be substantially reduced or eliminated.

Another object is to provide in a storage water heater of this character, means for holding a dielectric conduit in a position to extend into the water tank of the heater in conductive connection with a water conduit.

A further object is the provision in a storage water heater, of means whereby an electric non-conductive pipe or tube, which may be fragile, readily may be assembled into the water tank after said tank has been installed in its permanent position, thereby avoiding the hazard of breakage of said non-conductive pipe or tube during handling and shipping of the heater.

Other objects and advantages reside in details of design and construction which will be more fully disclosed in the following description and in the drawing wherein like parts have been similarly designated and in which:

Figure 1 is a fragmentary view partly in section, of a dielectric conduit union which is made according to a preferred form of the invention; and Figure 2 is a view, partly in section, of a typical storage water heater that embodies the present inventive concept.

In order to disclose an operable reduction to practice of the present invention, reference will be had to the accompanying drawing. However, it is to be understood that the example herewith illustrated and described is not intended to express or imply any limitation to this inventive concept, the scope of which is measured by the appended claims.

In the drawing, reference character 5 denotes a conductive conduit which may be considered as a water pipe, a gas pipe or the like. Reference character 6 denotes a continuation of conduit 5 which is dielectrically connected therewith by means of a special electrically non-conductive union designated as a whole by reference character 7.

The dielectric union 7 typically comprises a flange 8 which is preferably provided on a sleeve 9 which is threaded onto the conduit 6. The portion of the conduit 5 is provided with a threaded member 10 which is drawn toward the flange 8 by means of a union nut 12 which engages said flange 8 and the threaded member 10. The end of the threaded member 10 that is adjacent the flange 8, is reamed or countersunk, as shown at 10a, so that no metallic electrically conductive contact exists between the member 10 and the sleeve 9.

The union nut 12 does not engage in direct contact with the flange 8, but is separated therefrom by means of a dielectric gasket element 13 which completely surrounds the flange 8. A dielectric gasket element 13 may be made of material such as rubber, fibre, micarta or similar material having suitable strength, together with the desired sealing and dielectric properties. The dielectric gasket element 13 may be made in two pieces as illustrated, one having a rectangular cross section that is positioned next to the member 10 and the other having a Z-shaped section to fit around the flange 8. Under some circumstances, the dielectric gasket element 13 may be made of more than two members or if its material is elastic, it can be made entirely in one piece.

It will be seen that the threaded member 10 on the conduit 5 is thus drawn into a sealed engagement with the sleeve 9 on the conduit 6 through the intermediary of the flange 8 and the dielectric gasket 13. The result of this arrangement is that fluid is conducted freely from conduit 5 to conduit 6, but no electrically conductive connection between conduit 5 and conduit 6 is permitted.

Obviously, the dielectric union 7 can be made in optional sizes to suit various conditions and may be used in conduits for conducting a variety of fluids including water, oil, fuel-gas and the like. The details of the dielectric union 7 are subject to variation, particularly reversal of arrangements. The arrangement of parts herein illustrated, are typical and well adapted for the present purposes.

Referring next to Figure 2, reference character 14 denotes the tank of a typical storage water heater, which is surrounded by an insulating jacket 15, as is common practice, for the purpose of conserving heat units.

Below the water tank 14 is a typical gas burner 16 and the entire assembly is carried upon a plurality of supports or legs 17.

A water conduit 5a may be considered as the cold water supply to the tank 14 and corresponds to the conduit 5 of Figure 1. A short conductive pipe or nipple 6a is conductively connected with the tank 14 and corresponds with the conduit 6 of Figure 1. The conduit 5a and the nipple 6a are conductively joined by means of the dielectric union 7, the interior details of which may be as shown in Figure 1.

A water-conductive conduit 5b may be considered as the hot water outlet of the tank, which is connected with a short pipe or nipple 6b on the tank 14, through the intermediary of another dielectric union 7.

The gas supply conduit for the burner 16 is shown at 5c which is connected with a short pipe or nipple 6c through the intermediary of another dielectric coupling 7. The pipe or nipple 6c connects directly with the mixing chamber 18 of the gas burner 16.

Improved efficiency is usually obtained in a storage water heater of this type when the incoming cold water supply is discharged into the tank adjacent the lower portion thereof. Therefore, a dielectric tube 19 is held in the short pipe or nipple 6a in conductive connection with the incoming flow of cold water to the tank. The dielectric pipe or tube 19 is open at its lower end within the tank 14 adjacent the lower portion of said tank. The dielectric pipe or tube 19 may be held in the nipple 6a by any one of several means, such as, for instance, it could be cemented in the nipple or it could be provided with a slightly flanged upper end which would be enclosed in the union assembly 7.

The dielectric pipe or tube 19 may be made of any one of several suitable materials, such as, for instance, heat resisting glass, baked ceramic materials, such as porcelain or clay, or it could be a molded material or composition, such as Bakelite or any of the other modern molded plastics, or it could be made of cast material, such as a cement mixture.

If the floor upon which the storage water heater is to rest is considered as electrically conductive, such as a damp basement floor might well be, then the legs or supports 17 may be placed upon blocks of insulating material, as shown at 20.

Thus, is provided a storage water heater that is completely insulated electrically from the ground and from all pipe connections that may or may not lead to the ground. The dielectric pipe or tube 19 eliminates the tendency to set up an electrolytic or galvanic action within the tank 14, which commonly may occur if a metal pipe or conduit is inserted into a metallic tank, as has been the former practice.

The arrangement of pipe connections herein illustrated and described provides for easy installation of a storage water heater or the like, according to this inventive concept. The dielectric pipe or tube 19 readily may be inserted into the tank 14 through the short pipe or nipple 6a after the heater assembly has been set up in its permanent position and before the dielectric union 7 is closed. This point is advantageous in that the dielectric tube or pipe 19 may be fragile and easily broken. Therefore, it is advantageous to install said dielectric pipe 19 after all moving and handling of the water tank has been finished. Furthermore, if the dielectric tube or pipe 19 should, at any time, break or fail, a new one readily can be inserted by opening the dielectric union 7.

The dielectric unions 7 are well adapted to be used by anyone skilled in the art of plumbing or pipe fitting and can readily be used with ordinary commercial pipe.

A water heater built according to this disclosure is substantially free from galvanic action and electrolytic decomposition. It therefore will have a longer life of service.

Thus, the stated objects of this invention are fully accomplished and while this specification discloses preferred means for reducing the present invention to practice and a preferred embodiment of the invention, changes may occur to those skilled in the art and may be made within the scope of the appended claims, without departing from this inventive concept.

What I claim and desire to secure by Letters Patent is:

1. A device of the character disclosed comprising a tank, a body of water in the tank, a water-conductive dielectric conduit extending through a wall of the tank in water-tight relation thereto and extending into the body of water therein, means for heating the water in the tank, and means for conducting water away from the tank.

2. A device of the character disclosed comprising a tank, a body of water in the tank, a water-conductive dielectric conduit projecting through a wall of the tank in water-tight relation thereto and projecting into the body of water in said tank, means for heating the water in the tank, and dielectric means for conducting water away from the tank.

3. In a storage water heater having a tank, the improvement which comprises a dielectric conduit sealed into a wall of the tank and projecting into the interior of the tank, and means for holding the outer end of the conduit in sealed water-conductive connection with a water pipe.

4. In a storage water heater having a tank, the improvement which comprises a dielectric conduit extending through a wall of said tank, means for removably sealing the conduit in said wall, and means for holding the outer end of the conduit in sealed conductive connection with a water supply pipe.

5. The combination with a domestic water heater, inclusive of a metallic tank, of a metallic supply conduit for the tank, and a heat-resistant glass conduit connecting the supply conduit with the interior of the tank for the delivery of water thereto.

6. The combination with a domestic water heater, inclusive of a metallic tank, of a metallic supply conduit for the tank, and a porcelain conduit connecting the supply conduit with the interior of the tank for the delivery of water thereto.

7. The combination with a domestic water heater, inclusive of a metallic tank, of a metallic supply conduit for the tank, and a ceramic conduit connecting the supply conduit with the interior of the tank for the delivery of water thereto.

8. The combination with a domestic water heater, inclusive of a metallic tank, of a metallic supply conduit for the tank, and a dielectric molded conduit connecting the supply conduit with the interior of the tank and sealed through a wall thereof for the delivery of water thereto.

JOHN G. KEEGAN.